United States Patent Office 2,979,415
Patented Apr. 11, 1961

2,979,415
CEMENTITIOUS MATERIAL

John Boris Taylor, West Bridgford, Nottingham, England, assignor to The British Plaster Board (Holdings) Limited, London, England, a British company No Drawing. Filed Feb. 11, 1958, Ser. No. 714,493

Claims priority, application Great Britain Feb. 18, 1957

10 Claims. (Cl. 106—88)

This invention relates to cementitious materials and is particularly concerned with materials of the calcium sulphate type.

Cellular plasters in the set condition have been known for some years. The materials concerned are aerated in structure, numerous small air cells, pores or cavities being included within a matrix of set plaster. The dry materials are lighter in weight than ordinary set and dried plaster and form the basis of pre-fabricated building units such as blocks or slabs for thermal insulation. The materials are cast or moulded to the desired shapes before the freshly prepared foamed or aerated plastic aqueous slurries of water-setting plaster have become set and hardened. The foamed slurries are made using aerating machinery or by chemically generating gases within the agitated slurry, with the assistance of surface active agents. Chemical gasification is more difficult to control under site conditions than is mechanical aeration, and the former may sometimes give products liable to cause efflorescence. Mechanical aeration in practice involves the use of special machinery on the site because hand agitation of plaster slurries containing surface active agents is ineffective in comparison and gives a product of variable quality. Furthermore, a freshly foamed slurry of ordinary plaster and water (whether prepared chemically or mechanically) is quite unsuitable for use with conventional plasterer's tools; being rather like thin "jelly," it readily slides off the tools, and adheres only with difficulty to brick and other surfaces. It is very difficult to build up a thickness and the set and dried product often gives only a weak, powdery surface. All these methods suffer from the disadvantage that the freshly prepared aerated plastic mix has to be applied to a surface or moulded before it has set and dried and, unless prefabricated units are being made at a factory, the special equipment employed must be taken to the site where the material is to be used.

It is an object of the present invention to overcome these disadvantages and to provide a novel granular cellular or porous cementitious material of the calcium sulphate type.

With this object in view the present invention provides a cementitious material which comprises soluble anhydrite and/or calcium sulphate hemihydrate in the form of cellular or porous granular particles. As is well known, soluble anhydrite is that form of anhydrous calcium sulphate which has a high affinity for, and reacts very readily with water.

The term "cellular" as used herein means that the granular particles of the cementitious material or at least the predominating proportion of them, contain roughly spherical blind and/or interconnecting voids of a size greatly exceeding the size of the very fine pores normally present in ordinary calcined gypsums or calcium sulphate plasters.

The new material of the present invention, with the addition of retarder as necessary, can be bagged like ordinary plasters and transported to the sites where it is to be used. It can then simply be mixed with sufficient water to give a plastic mix of the desired consistency and then applied by ordinary plasterer's hand tools to a suitable surface or poured into moulds. The final set and dried product preserves a large measure of porosity due to included air cells.

It will be understood however that the material of the present invention can be used for purposes other than hand plastering. Thus for example it may be desirable to produce the new materials in the form of large granules e.g. pea size, the size employed depending upon whether or not it is desired to include large air spaces in the block or filled cavity. Such large granules can be caused to adhere by merely applying light pressure, pouring water over them and allowing the product to set and dry.

When used for plastering, smaller granules will in general be used. If desired, the new material may be mixed with light weight aggregates such as expanded perlite or exfoliated vermiculite. Furthermore the new material may be mixed with ordinary plasters for all the usual applications including the making of plaster board. The new material, if suitably retarded, may also be diluted with some comminuted and dried set foamed plaster, i.e. the diluent is in itself non-cementitious, being in the gypsum condition. These materials are particularly suitable for the manufacture of pre-cast units.

The new material of the present invention has a number of advantages. It may be bagged and stored under dry conditions for lengthy periods (comparable with the usual period of storage of conventional light-weight aggregate plasters) until required for use. It is very easily mixed with water by hand tools or plaster mixing machines to the desired consistency for the particular application with minimum wastage. The properly gauged wet mix feels and works very much like a mixture of expanded perlite and plaster, even though no perlite aggregate be present, and is indeed of a similar order of lightness on the trowel as a conventional light-weight aggregate plaster mix and much lighter than an ordinary sanded plaster mix. The ordinary retarders of set, such as powdered keratin, can be added to the new material at the factory or on the site to control the working time and setting time for the particular application. The neat, suitably graded, material after mixing with water is suitable for plastering on all the usual grounds, such as brick walls, plasterboards, or expanded metal lathing, and has good bonding properties. The wet mix has excellent working properties when used for plastering, being easy to spread and work with wood or metal tools, with little tendency to "reeve" or tear apart at the surface when trowelling. It may readily be built up into a normal undercoat thickness (say about ½") and rules well to a smooth surface. The new material used neat in admixture with water, exhibits only low dimensional changes on setting and drying and in particular only small plastic shrinkage; a particularly important advantage is the reduced tendency to crack as compared with ordinary plasters, even on high suction backings.

The rate of drying on a wall is of a similar order of magnitude to that of perlited plasters.

The wet density on the trowel of a mixture of the new material and water at plastering consistency is of the order of 65–75 lb./cu. ft., depending on the starting material and degree of original foaming, and the dry density on the wall is of the order of 50–60 lbs./cu. ft. These are to be compared with a wet density of the order of 125 lb./cu. ft. for a normally gauged mixture of 3 volumes of sand and 1 volume of ordinary undercoat plaster and a corresponding dry density on the wall of about 100 lb./cu. ft. The usual water mix for gauging the new material for application as an undercoat plaster may, for example, be in the region of 70–75 parts by weight of water to 100 parts by weight of plaster. The dry compressive strength at this gauge may be in the region of 250–550 lb./sq. in., depending on the material and the water gauge. (The product obtained using anhydrite as a starting material has a higher strength but is also usually denser.)

Undercoats of the new type of plaster can be satisfactorily finished with a perlited and vermiculited finishing coat, and some (but not all) types of the new plaster can themselves be used as a finishing coat provided they are reduced to a suitable sieve size, especially when the suction is not too fierce. When used as a finish, a noteworthy property is the ease of mixing, with very little tendency to formation of lumps, and in such cases the finishing coat applies with plenty of plasticity, trowelling to a smooth surface being easy.

The new material is lighter, volume for volume, than an ordinary neat plaster, and the numerous air cells, pores or cavities, some of which are interconnecting and some of which are isolated or blind, make for enhanced sound absorption and good thermal insulation, coupled with good fire resistance. The new material may therefore serve as the basis of an acoustic plaster or be used to provide thermal insulation for pipes, awkward bends and the like. (The aerated structure of the set dry product is maintained even when in prolonged contact with metal surfaces at temperatures in the neighborhood of 100° C., despite partial dehydration, so that the thermal insulation advantages are sufficiently maintained.) The new material may be mixed with water and then poured into moulds and the like and may also be used to make slabs, or for filling cavities. It may also be used to make permeable moulds for casting other materials. Thus, it may be used for making moulds for use in the moulding of molten metals, such as aluminum, without the need for in situ foaming of the plaster. (In making moulds it may be desirable to treat the surface of the pattern with a parting compound or foam-breaking agent or otherwise impart foam-breaking properties to the surface.) The new material may also be used as a granular dessicating material particularly when the cellular granules are substantially in the soluble anhydrite condition.

The new material may be used in admixture with other light-weight aggregates (e.g. vermiculite, pumice) or lime, or other calcium sulphate plasters for any of the cited applications, or it may be introduced as an aggregate into the plaster slurry used for making plasterboard. Where the acceleration of set effect is of no consequence, the new material may be diluted with an aggregate composed of comminuted set dry foamed plaster in the gypsum condition.

The present invention also includes a process for the manufacture of the new material of the present invention wherein a non-cementitious cellular or pre-foamed set mass consisting wholly or mainly of calcium sulphate dihydrate is comminuted and is dried and calcined before or after comminution to produce a cementitious material.

The drying and calcining may be effected either during one operation or successively and it will be understood that the calcining must not be effected at such a high temperature that the material becomes dead burnt and consequently no longer cementitious, the object of calcining being to restore the material to the cementitious state. The calcining may be either an ordinary calcining or an autoclave calcining.

An embodiment of the invention will now be described by way of illustration. According to this embodiment foamed or aerated gypsum plaster, prepared by methods known to those skilled in the art, is allowed to set. It is then comminuated into granules. The comminution may advantageously be effected while the set material is still damp, although this is not essential. The granules may then be dried and then calcined, or dried and calcined or partially calcined in one operation at an elevated temperature, provided that the temperature is not so high as to convert the material to a dead-burnt state. (The granular nature of the material facilitates the process of drying and calcining.) The calcined or partially calcined material is largely calcium sulphate hemihydrate and/or soluble anhydrite, depending upon the conditions employed and the duration of calcination and should preferably have a gypsum content of less than 3%. The freshly calcined material is cementitious and will set when mixed with an appropriate amount of water. For certain laboratory test purposes the freshly calcined material may be conditioned in a damp atmosphere for a period of time sufficient to convert any soluble anhydrite to the hemihydrate but not so long as to restore the material to a non-cementitious state such as the dihydrate, but such conditioning of the freshly calcined material is not necessary when it is to be used in a practical application, and bagging will normally be carried out immediately the calcined, comminuted and screened material has been mixed with retarder. The new material is cementitious, when gauged with an appropriate amount of water, whether it is in the hemihydrate condition or is a mixture of hemihydrate and soluble anhydrite.

It has been discovered that the essential cellular structure of the material is, quite surprisingly, preserved in large degree, not only during the calcination, but throughout the entire sequence of operations involved, provided that the mechanical comminution is conducted in such a way as to avoid excessive crushing, which would give a fine powder rather than granules. A particularly interesting feature of the process is that calcination of the cellular gypsum under the conditions described to give hemihydrate and/or soluble anhydrite still preserves the essential cellular structure, and it is remarkable that on gauging the new material with the appropriate quantity of water the granules cement together and set, the final product retaining the cellularity or porosity in large measure. The final porosity of the set dry material is less than that of the original foamed gypsum plaster, but by starting with a highly foamed material a substantial degree of porsity is retained in the end-product of the cycle of operations.

As an alternative to ordinary calcination, an autoclave process can be used in which the still damp set comminuted material is heated in water under pressure at about 140° C. in the presence of sodium succinate or other crystal habit modifying agent; thus the agent may be 0.1% of succinic acid and 1.0% of calcium carbonate based on the weight of the gypsum or the water, which are usually taken in approximately equal weight proportions. When conversion to plaster of Paris is complete the material is removed and dried at a temperature of about 110° C. The whole cycle of steps in the process may be carried out using autoclave methods of dehydration throughout. Calcination can also be effected by heating in steam in a closed pressure vessel at 140–190° C. followed by drying at 110° C.

A screening operation can be carried out either prior to calcination using the damp or dry material, or after calcination using the dry material. Advantageously, the damp material may be coarsely comminuted to lumps and a further comminution effected after calcination. Thus the damp material may be chopped by a suitable arrangement of knife blades, and then vibrated, and the material may then be passed through a commercial comminuting mill after calcination. A suitable mill for either damp or calcined material is one which consists simply of a chamber containing a set of blades rapidly swinging or rotating in mutually parallel planes about an axis driven at high speed, into which the material (in the form of lumps a few inches in size) is introduced. The chamber may be open at the bottom or optionally fitted with, for example, a suitable perforated plate. The range of particular sizes required will depend upon the ultimate application. For certain wall plastering applications the range −10 to +100 mesh British Standard Sieve size may for example be selected. Frequently sieving to −5 mesh British Standard Sieve size gives a satisfactory product for wall application without the need for removing material finer than 100 mesh British Standard Sieve size, providing the comminuting machine used does not give more than a few percent of fines. Furthermore it is quite feasible to calcine quite large pieces of foamed material, e.g. up to one or one and a half inches in thickness, if desired, and subject the calcined material to comminution and screening as desired at a later stage. Screening is most easily done with the calcined material.

The initial material for carrying out the process of the present invention is foamed plaster in the set non-cementitious state of this material and this material may be made by any desired process starting from calcined gypsum, partially calcined gypsum or other calcium sulphate plaster including hemihydrate plasters and anhydrous plasters and natural anhydrite.

Anhydrite, suitably accelerated, is cementitious and does not have to be calcined to give the starting material for foaming. Hemihydrate plaster is made by calcining gypsum and calcination adds to costs. Finely ground natural anhydrite can be used, preferably with the addition of an accelerator of set, such as a mixture of potassium sulphate, zinc sulphate and aluminium sulphate. When I use natural anhydrite (ground to a specific surface of say, 10,000 sq. cms. per gram) the foamed material in the foaming machine should be accelerated, not retarded, to cause it to set in a reasonable time after discharge. However, after calcination of the set foamed material, the end-product contains an adequate proportion of hemihydrate apart from some residual insoluble anhydrite, and needs retarding as usual; thus the difficulties associated with anhydrite are largely removed, being encountered only at an early stage in the process, and the end-product is quite useable.

Mixtures of anhydrite and gypsum, and mixtures of anhydrite, gypsum and hemihydrate plaster may also be used.

There are two principal known methods of effecting the foaming, namely mechanical and chemical methods. Mechanical aeration may be effected by the following methods:

(a) Air is beaten into the plaster slurry by a suitable machine, in the presence of surface active agents which promote foaming, and the aerated mass is allowed to set and harden and possibly dry.

(b) Calcined gypsum or partially calcined gypsum or other calcium sulphate plaster is introduced into a mass of pre-foamed air and water bubbles and thoroughly mixed in; the mass is then left to set and harden and possibly to dry.

(c) A pre-formed foam of air and water is introduced into a plaster slurry and thoroughly mixed in; the mass is then left to set, harden and possibly to dry.

The set of the plaster is retarded, if desired, by using sufficient retarder (such as powdered keratin) to allow time for adequate aeration. In all the methods surface active agents are employed to reduce the surface tension of the water and promote foaming. Sometimes foam stabilising and/or strengthening agents are also included in the plastic mix. For some purposes it may be advantageous to effect foaming using warm materials, say up to 50° C.

Chemical foaming may be effected as follows:
Gas producing agents or mixtures of agents are allowed to generate gases within a plaster slurry in the presence of foaming and/or stabilising agents, and the mass is allowed to set, harden and dry (for example, hydrogen peroxide may be decomposed to liberate oxygen, or calcium carbonate and an acidic substance may be used to liberate carbon dioxide).

Examples of surface active agents suitable to promote foaming are as follows: secondary alkyl sulphates (and their sodium salts), sodium alkyl aryl sulphonates, soap bark, saponins, condensation products of ethylene oxide and substituted phenols or fatty alcohols, dodecyl benzene sodium sulphonate and the potash soap of natural wood resins.

The agents employed must be miscible with water and must be stable to calcium sulphate. The amount of agent employed depends upon the degree of aeration required, the type of machine used and the duration of the process.

Examples of foam stabilising agents are as follows: gelatin, gum arabic, boiled starch, and condensation products of urea or urea derivatives and formaldehyde or other aldehydes, with the appropriate hardening agents. The urea-formaldehyde condensates give good stabilisation when they are present in quite small percentages, but when larger amounts are used (up to 10% by weight referred to the weight of plaster) they make in addition a noteworthy contribution to the compressive strength of the final set material. It is not normally necessary to use a foam stabilising agent as well as a surface active agent.

In view of the fact that the foamed product has to be dried and calcined it is advantageous for the purpose of the present invention to adopt a foaming procedure which reduces the water content of the plastic mass prior to setting to a minimum consistent with the development of a satisfactory degree of aeration or gasification. Less surplus water will then have to be evaporated from the material during the drying operation.

The eventual strength of the foamed set material and hence of the end-product (and also the set and dried material after application) will depend partly on the porosity of the material and partly on the intrinsic strength of the material constituting the walls of the bubbles or cells. It is well known that plasters of low water mix give stronger products when set and dry and that the purity of a plaster affects the strength. It is therefore advantageous to obtain the requisite lightness of the foamed material in the foaming machine by the introduction of air rather than water, that is to say, to minimise the water introduced and to introduce sufficient air to get the desired foam density. A further aid to minimising the water requirement is to employ a plater of low water demand if possible.

A typical value of the bulk density of wet foamed material as discharged from the foaming machine would be in the region of 40–47 lb./cu. ft. (The actual value chosen would depend on the nature of the starting material and the uses to which the end product is to be put.) After calcination, drying, comminution and screening to pass a No. 5 mesh British Standard Sieve the loose dry bulk density of the end-product ready for addition of retarder and bagging would also be in the region of 30–36 lb./cu. ft.

A particularly good quality end-product would normally require a starting material containing not less than 80% hemihydrate, although less pure plasters can in fact be used, and the sieve analysis of the starting material should preferably be say 60% finer than 200 mesh (British Standard Sieve size) and not more than say 3% coarser than 52 mesh.

A marked improvement for some purposes in the properties of the product of my invention can be obtained by adding quite small amounts of hydrated lime (calcium hydroxide) or (calcium oxide) to the mixture of plaster, water, foaming agent, etc. in the foaming machine. The effect obtained cannot be equalled by simply adding the hydrated lime to the end-product as a simple additive in the bag. Although small additions of lime to plaster are sometimes made by plasterers to give an extra degree of "fattiness," the role of the lime added at the foaming machine stage of the process of this invention is apparently very different. It so modifies the nature of the foamed mass that when the latter is set there is a noticeable increase in the crispness and hardness of the set material. This crispness gives the material increased granularity and the appearance and "feel" of a conventional lightweight plaster to an even greater degree than obtained when the hydrated lime is omitted from the original foaming stage. The product is not obviously different by simple casual touch and appearance from, say, a mixture of ordinary plaster and expanded perlite. The addition of lime at the foaming stage also has two valuable additional consequences. One is that the end-product is rendered, when gauged with water, less sticky to the trowel and other tools (it leaves the tools cleanly) and indeed by varying the amount of lime added at the foaming stage from zero to, say, 3% based on the weight of plaster the mixing and working properties of the end-product can be controlled with special reference to its degree of fattiness, leanness and stickiness. The omission of lime does not, however, necessarily lead to an undesirable degree of stickiness in the end-product. Much depends on the quality of the original plaster used as starting material and on whether other materials are incorporated in the foam, and for some purposes the omission of lime is preferred.

The percentages of hydrated lime introduced into the foaming machine may vary from zero to 3% (referred to the weight of dry plaster) and more usually ½–2%, the higher percentages being particularly valuable for those varieties of plaster which have a high content of clay.

Up to 5% of Portland cement based on the weight of the plaster, may be used as an alternative to lime as an additive at the foaming stage to reduce stickiness and secure the other advantages mentioned above, but lime is preferred.

The addition of a small proportion of potassium alum at the foaming stage also improves the crispness and, especially, reduces the stickiness and improves the working properties of the gauged product and the hardness of the set plaster on walls. Up to 3% of alum may be added at the foaming stage. Ammonium alum, borax, aluminium sulphate, calcium chloride and ammonium sulphate are also useful additives at the foaming machine stage.

Other additives which may be incorporated in the product of this invention by addition at the foaming stage in small proportions with a view to reducing the stickiness or improving the working properties or strength of plaster mixes obtained by gauging the product of my invention with water are gum arabic and sulphite lye powder (calcium lignosulphonate).

Combinations of various of the additives mentioned above may be incorporated in the foam. Usually the additions will be made in amounts exceeding ½% but not exceeding 3% on the weight of the plaster.

I have already pointed out that my new material may be used in admixture with aggregates such as expanded perlite and exfoliated vermiculite, and these may either be added at the foaming machine stage or mixed in afterwards along with the retarder.

It has also been found that gypsum, for example mineral gypsum, may itself be used added as a solid diluent at the foaming machine stage, that is to say, a part of the plaster may be replaced by gypsum, provided the latter is finely ground, in the original foaming operation. However, sufficient plaster, that is to say cementitious material, must still be present to set and form the essential framework of the final foam. Furthermore, either the presence of the gypsum must not accelerate the set unduly or, alternatively, sufficient retarder must be used to prevent an inconveniently fast set.

An advantage of the use of gypsum as an additive is that the process is cheapened. Plaster is more expensive than gypsum, having been through a calcination process. It appears that the gypsum becomes incorporated in the skeleton of foamed material. When the foamed material is recalcined the gypsum present is calcined to plaster and there is thus no gypsum present in the end-product if the calcination is properly carried out. I have succeeded in making a useable product with half of the initial plaster replaced by mineral gypsum in the foaming machine but when only one-third of the plaster is replaced by gypsum the general properties of the product are superior.

Another important solid diluent which may be added at the foaming machine stage is pulverised fuel ash or fly ash ("p.f.a.") from coal-burning power stations. Fly-ash is a grey powder, finer than cement, and is a waste product of coal-burning power stations. It is very cheap, transport being virtually the only charge. Furthermore, it is reputed to have pozzolanic properties when mixed with cement or lime. I have added p.f.a. to the plaster mix at the foaming machine stage together with a small amount of either lime or Portland cement, to take advantage of any pozzolanic effects. I have made a useable product with half the plaster in the foaming machine replaced by p.f.a., but I prefer to replace only up to one third of the plaster (by weight) by p.f.a. as the strength of the resultant cellular material is more satisfactory.

The pulverised fuel ash occupies space within the solid portions of the cellular granules which would otherwise have been filled by calcium sulphate plaster and therefore cheapens the product. Finely ground granulated slag or limestone may be used similarly as solid diluents at the foaming stage.

Pigments for colouring the end-product may also be very conveniently introduced at the foaming machine stage, very uniform dispersion being obtained.

In general, any additive may be incorporated at the foaming stage which either improves the consistency of the wet foam, confers valuable physical characteristics on the structure of the foam (both in the machine and persisting right through to the cellular plaster end-product), or confers useful chemical properties, for example, pozzolanic properties, on the end-product. Pozzolanic properties means the property of hardening in the course of time by virtue of a chemical reaction between the pozzolanic material and lime; to secure such properties lime or cement has to be included in the end-product, for example by addition at the foaming stage or simply by mixing into the end product either at the bagging stage or on the site.

The following examples illustrate the process of the present invention, and the production of the products of this invention:

EXAMPLE 1

Two Imperial gallons of water containing 5 grams of powdered keratin retarder were placed in a commercial paddle mixer, fitted with impeller blades so arranged as to create a "whirlpool" action in mixing, above which was fitted a pre-foaming attachment, the agitators being electrically driven. The surface active agent used to promote foaming was an aqueous solution of secondary alkyl sulphates and other anionic surface active agents. 25 grams of concentrated surface active agent were mixed with 4 litres of water. One litre of this mixture was added to the water already in the main part of the mixer and the mixer was started. After 30 seconds, 50 lbs. of a calcium sulphate hemihydrate plaster described as a "coarse boiled" tube-milled kettle plaster and having the following particle size analysis:

| British standard sieve size: | Weight percent |
|---|---|
| −10 +36 | 0.8 |
| −36 +52 | 2.2 |
| −52 +72 | 1.4 |
| −72 +100 | 2.4 |
| −100 +150 | 4.7 |
| −150 +200 | 6.7 |
| −200 | 81.8 | were added to the water in the mixer and at the same time a litre of the foaming agent solution was placed in the pre-foaming attachment, and the foam generated in the latter after 1½ minutes aeration was then discharged into the slurry in the main mixer. A further litre of foaming agent solution was placed in the pre-foamer and the resulting foam was again added to the slurry after 1½ minutes. The fourth litre was similarly employed after 1½ minutes pre-foaming. Another ½ minute of agitation was allowed to complete the mixing of the foam and slurry. The creamy aerated slurry was then discharged into trays and allowed to set in quiescent condition. It was then mechanically comminuted into granules small enough to pass a 10 mesh British standard sieve. (A test sample of the un-comminuted material was set aside and dried for 24 hours at 40° C., and was then found to have a bulk density of 24 lbs. per cubic foot. By bulk density is meant the weight per unit volume when the volume is taken as the volume of a container just filled with the material.)

The main quantity of damp comminuted material was then allowed to dry and calcine in one operation by placing it overnight on trays in a ventilated oven at about 150° C. Material finer than 100 mesh (British standard sieve) was then removed. 100 parts by weight of the cellular material, which had now been restored to a cementitious condition, were gauged with 64 parts by weight of water. The set product was dried for 24 hours at 40° C. It was found to have a bulk density equivalent to 69 lbs. per cubic foot, and a dry compressive strength of approximately 750 lbs. per square inch. Another 100 parts by weight of the cellular cementitious material were gauged with 80 parts by weight of water. The set and dried product now had a bulk density equivalent to 56 lbs. per cubic foot and a dry compressive strength of approximately 550 lbs. per square inch.

Microscopic examination of the original set plaster foam, the cellular cementitious material, and the final set and dried material after mixing the cellular cementitious material and water, clearly showed the presence of numerous cavities and holes, both blind and interconnecting, in all the specimens examined, although there was evidently a reduction in overall porosity, as shown by the density data, in going through the cycle of operations.

The following table, in which the percentages are by weight, gives the chemical analyses of the original kettle plaster and of the freshly calcined comminuted cellular plaster.

|  | Tube milled kettle plaster, percent | Freshly calcined comminuted cellular plaster, percent |
| --- | --- | --- |
| Soluble anhydrite ($CaSO_4$) | negligible | 74 |
| Calcium sulphate hemihydrate ($CaSO_4.\tfrac{1}{2}H_2O$) | 65 | negligible |
| Gypsum ($CaSO_4.2H_2O$) | 9 | 1½ |
| Insoluble anhydrite ($CaSO_4$) | 2 | negligible |
| Clay | 16 | 16 |
| Carbonate (as $CaCO_3$) | 7 | 7 |

Subsequent conditioning in ordinary air at about 65% relative humidity converted the soluble anhydrite to the more stable hemihydrate.

The main sample of the cellular cementitious material prepared as described in this example and which was not given any special exposure to air after calcination, was mixed with powdered keratin retarder (0.2% on the weight of the cellular cementitious material) and gauged to a workable consistency and plastered on a brick wall to normal undercoat thickness, on expanded metal lathing and on plasterboards of various types. A good bond was obtained in each case, with very little cracking. Another sample, similarly retarded, was diluted by mixing it with expanded perlite in the ratio of 1 volume of perlite to 2 volumes of the cellular cementitious material. This material also was successfully used for plastering walls. A sample of the cellular cementitious material prepared as described in this example was again retarded with 0.2% of keratin retarder and mixed to a rather wet consistency suitable for application as a finishing coat and plastered on undercoats (both neat and perlited) composed of the new cellular material.

EXAMPLE 2

A procedure similar to that described in Example 1 was carried out using as starting material an autoclave plaster of high purity but with some variations in the proportions used and in particular a 5% reduction in the total water mix. A 17% loss in weight (relative to the weight of the dry material before calcination) was obtained on calcination of the foamed material at 150° C. for only 3 hours. The calcined cellular product set to give a hard cellular mass when gauged with sufficient water to give a workable mix. 70 parts by weight of water were used per 100 parts by weight of plaster, and the bulk density of the set dry product was 68 lbs. per cubic foot and it had a dry compressive strength of 1700 lbs. per square inch. When 105 parts by weight of water were used per 100 parts by weight of plaster, the bulk density of the set dry product was about 49 lbs. per cubic foot, and the dry compressive strength was 650 lbs. per square inch.

EXAMPLE 3

A procedure similar to that described in Example 1 was carried out using as starting material an anhydrous plaster but with some variations in the proportions used, with the difference that the keratin retarder was replaced by a mixture of 1% of potassium sulphate and 0.2% of zinc sulphate (calculated on the metallic oxides and referred to the weight of plaster employed). A water-setting cellular material was once again obtained.

EXAMPLE 4

The process described in Example 1 was carried out with the same coarse-boiled tube-milled kettle plaster but in this case the freshly comminuted damp, set, foamed plaster (in the gypsum state) was dehydrated by placing it in an approximately equal weight of liquid water containing 0.1% of sodium succinate, based on the weight of the water, in an autoclave and the autoclave was heated at 140° C. for 1½ hours under positive steam pressure. At the end of this time the cellular material was removed, squeeze-dried and then finally dried in hot air at about 110° C. The cellular product was gauged with 50 parts by weight of water per 100 parts by weight of solid. The mix set to give a cellular product which, when dry, had a bulk density of 71 lbs. per cubic foot.

EXAMPLE 5

The process described in Example 1 was carried out using as starting material a pan plaster of high purity again with some variations in the proportions used, but the freshly comminuted damp, set, foamed plaster (in the gypsum state) was dehydrated by autoclaving in steam at 140° C. for 1½ hours (i.e. free from contact with bulk liquid water). A cementitious cellular product was again obtained.

EXAMPLE 6

The procedure described in Example 1 was repeated using a solution of the sodium salts of the higher secondary alkyl sulphates as foaming agent and with the addition of from ¼% to 1% (based on the weight of dry plaster used) of boiled farina starch.

The weights of foam stabilising agents used usually varied from ¼ to 1% based on the weight of dry plaster and in the case of resin 350 up to 5% was also used.

EXAMPLE 7

2 Imperial gallons of water were placed in the Winget mixer employed in Example 1 together with 15 grams of keratin. 23 grams of a concentrated aqueous solution of the sodium salts of the higher secondary alkyl sulphates (together with a foam promoter) were mixed with 1 Imperial gallon of water and 3 litres of this solution were put aside for foaming. The balance of the solution was added to the water in the main mixer. ½% of a urea-formaldehyde condensate resin (a urea-formaldehyde condensate resin supplied by Aero Research Ltd., used together with the appropriate hardener L. 48 supplied by the manufacturers) calculated on the weight (50 lbs.) of dry plaster plus a quantity of hardener equal to $\frac{1}{7}$ of the weight of resin R, was stirred into the 3 litres of solution which had been set aside. Foaming and mixing were then carried out generally as described in Example 1. The set foam had a bulk density, when dry, of 36 lbs. per cubic foot. After comminuting and calcining as in Example 1 the cellular cementitious product when gauged with 80 parts by weight of water to 100 parts by weight of solid, set to give a cellular product of dry bulk density 55 lbs. per cubic foot and a dry compressive strength of 620 lbs. per square inch.

EXAMPLE 8

The procedure described in Example 1 was followed using coarse-boiled tube-milled kettle plaster, mixed with Portland cement and ground granulated blast furnace slag of specific surface 4750 square cms. per gram, in the weight proportions 25:2:23, as the initial material. The foamed set plaster so produced had a dry bulk density of 48 lbs. per cubic foot and a dry compressive strength of 800 lbs. per square inch after 14 days damp storage followed by drying. The comminuted and calcined material set to give a hard cellular product when gauged with sufficient water to make a plastic mix.

EXAMPLE 9

A process similar to that of Example 1 was carried out using the same "coarse boiled" tube milled kettle plaster, which contained 65% hemihydrate, about 9% gypsum, 16% clay and 6% calcium carbonate. The quantities used differed slightly from those of Example 1, hydrated lime being added to the extent of 1% by weight based on the weight of plaster. The quantities were 49.5 lbs. of plaster, 227 g. of hydrated lime, 21 lbs. of water, 15 g. keratin retarder, and 4 litres of aqueous foaming agent as in Example 1 solution (containing 0.625% concentrated agent supplied by the manufacturer). 1 litre of the latter was added to the initial mixture in the main mixer and the balance was added in 3 batches via the prefoamer as before. The time in the pre-foamer for each of these batches was reduced from 1½ minutes to 1 minute. The procedure was otherwise the same as in Example 1. The set foamed material felt noticeably crisper than the product of Example 1 and comminution was facilitated. The comminuted product was dried and calcined in one operation for 24 hours at about 375° F. in a Tray Dryer/calciner (an electrically heated drying cabinet with air circulation, a portion of the air being re-circulated in each cycle and a portion changed. The end product was screened through a No. 5 mesh (British standard) vibratory screen and after mixing with keratin retarder, it was bagged. The plaster was later tested as a lightweight undercoat plaster on backings of clay brick and sand-lime brick, and also on expanded metal lathing by a plasterer, using both wood and metal tools. A noticeable reduction in "stickiness" was achieved by the introduction of lime into the foaming machine. After 42 hours the backings were satisfactorily finished with a conventional lightweight perlited and vermiculited finishing plaster. The dry bulk density of the bagged material was 36 lb./cu. ft. The water mix used by the plasterer was 72 parts by weight of water to 100 parts by weight of plaster. The wet density of the mix as used on the trowel was only 70 lb./cu. ft. and a high coverage figure was obtained.

EXAMPLE 10

A process similar to that described in Example 9 was carried out using a mixture of plaster and pulverised fuel ash from a coal-burning power station and omitting lime but adding cement. The quantities used were 33 lb. of a high purity pan plaster of analysis 89% hemihydrate, 1.4% gypsum, 1.5% soluble anhydrite, and 3.3% insoluble anhydrite, 17 lb. of fly ash, 2.5 lb. of Portland cement, 25 lb. water, 15 g. keratin and 4 l. of foaming agent solution as before. The fly ash was added 10 seconds after adding the plaster. (The fly ash sieve analysis gave 95% finer than 100 mesh, and only 1% coarser than 52 mesh. The chemical analysis of the fly ash was silica 44%, alumina 27%, lime 8%, magnesia 2%, iron oxide 10%, titania 1%, water solubles 3%, and ignition loss 5%. The water soluble material was mainly calcium sulphate, and the soluble sodium and potassium and magnesium salts (expressed as oxides) were only 0.04%, 0.02% and less than 0.01% respectively. A 1% aqueous suspension of the ash had a pH of 10–11). The end product of our process gave excellent working properties, with no stickiness, even though lime was not used in the formulation. The water mix of keratin retarded plaster was 72 parts by weight of water to 100 parts by weight of plaster. The wet density on the trowel was 73 lb./cu. ft. A noticeable hardening of the material developed on the test walls after several months. This was probably due to a certain degree of a pozzolanic reaction with the Portland cement, which was included in the original mix in the foaming machine.

EXAMPLE 11

The raw material in this example was natural anhydrite ground to a specific surface of 10,000 cm.$^2$/g. The analysis was

| | Percent |
|---|---|
| Anhydrite | 85 |
| Gypsum | 9 |
| Carbonate | 4 |
| Other acid insoluble matter | 1½ |

The procedure was similar to that of Example 9 except that an accelerator for the anhydrite (consisting of a mixture of zinc sulphate, potassium sulphate, aluminum sulphate and Portland cement) was added in the foaming machine. The quantities used were 48 lbs. anhydrite, ½ lb. aluminium sulphate dissolved in 4 litres of water, ½ lb. zinc sulfate dissolved in ½ litre of water, ½ lb. potassium sulphate dissolved in 2½ litres of water, ½ lb. Portland cement and 4 litres of foaming agent as in Example 1 (concentration as before) introduced in the same way as before. The comminuted calcined end-product was retarded with 0.2% keratin retarder. The proximate analysis of the end product was:

| | | |
|---|---|---|
| Free H$_2$O | percent | 0.1 |
| Soluble anhydrite | | Nil |
| Hemihydrate | percent | 67.1 |
| Gypsum | do | 2.9 |
| Insoluble anhydrite | do | 26.8 |

It was tested by an expert plasterer on various backings. The water mix was 50 parts by weight of water to 100 parts by weight of plaster. The wet density on the trowel was heavier than usual, 90 lb./cu.ft., but this was still less than an ordinary sanded plaster undercoat mix; the dry density on the wall was 60 lb./cu. ft., appreciably lighter than a sanded plaster undercoat. The dry compressive strength was about 800 lb./in.$^2$ The material preserved a high degree of cellularity throughout these operations.

EXAMPLE 12

This is an example of the dilution of the foamed plaster mix in the foaming machine with mineral gypsum. The quantities employed were:

34 lbs. hemihydrate plaster,
16 lbs. mineral gypsum,
25 lbs. water,
0.75 lb. hydrated lime.
4 litres of foaming agent solutions as in Example 1 (of the same concentration as before, 3 litres being pre-foamed as usual), and
100 g. keratin.

The mineral gypsum sieve analysis was 90% below 100 mesh and only 0.2% coarser than +52 mesh (British standard).

The procedure was generally the same as in Example 9, but the gypsum was not added with the plaster, but was added to the main mixer after all the other ingredients had been foamed, to avoid the accelerating effect of the gypsum leading to blockage of the machine by causing a premature set. The foamed slurry was discharged in good time before set commenced. Calcination was effected in a tray dryer. The wet density on the trowel was 74 lb./cu. ft. and the dry density of the set material on the wall was 47 lbs. per cu. ft.

EXAMPLE 13

A process similar to that of Example 9 was performed, using a good quality hemihydrate kettle plaster as starting material. A small quantity of ammonium sulphate was introduced into the mixture for foaming in addition to lime. The quantities used were:

50 lbs. hemihydrate plaster,
700 g. ammonium sulphate,
700 g. hydrated lime,
27 lbs. water,
50 g. keratin, and
3½ litres of foaming agent solution as in Example 1 (of the same concentration as before, 2½ litres being introduced via the prefoamer).

The set comminuted product was calcined in a tray calciner at 150° C. The end product was suitably retarded and after gauging to a plastering consistency the plaster was applied to a brick wall. The set dried material had an unusually high degree of superficial hardness. The wet bulk density on the trowel was 75 lb./cu. ft. The dry bulk density of the set material was 52 lb./cu. ft.

EXAMPLE 14

A process similar to that of Example 9 was carried out using a kettle plaster of the following chemical and sieve analyses:

*Chemical analysis weight percent*

| | |
|---|---|
| Hemihydrate | 91.5 |
| Soluble anhydrite | Nil |
| Gypsum | Nil |
| Insoluble anhydrite | 0.6 |
| Calcium carbonate | 2.2 |
| Free moisture | 0.6 |
| Other acid insoluble matter | 4.6 |

*Sieve analysis*

British Standard
| Sieve size: | Weight percent |
|---|---|
| +36 | 0.3 |
| −36+52 | 1.5 |
| −52+72 | 3.3 |
| −72+100 | 7.6 |
| −100+150 | 14.4 |
| −150+200 | 11.0 |
| −200 | 61.9 |

The following quantities were used in each batch prepared:

49 lbs. plaster,
1 lb. hydrated lime,
26 lbs. water,
10 grams keratin, and
4 liters foaming agent solution as in Example 1 (0.625% as before)

The damp set foamed material was coarsely comminuted into lumps of the order of 1–1½" diameter. The damp lumps were then dried and calcined in a Rotary Louvre Dryer (as supplied by Dunford & Elliott Process Engineering Ltd., Linford Street, London, S.W. 8, England). The hot gases (coal-gas heating) at the inlet had a temperature of about 400° C. and the temperature of the dried and calcined material at discharge was about 150° C. The duration in the hot zone was about 40 minutes. Most of the product was already comminuted to the desired size range by the action of the rotary calciner itself. By passing through a commercial comminuting mill the few residual lumps greater than 5 mesh (British Standard) were also comminuted; a final screening was then carried out through a vibratory screen.

The proximate chemical analysis of the end-product was as follows:

| | Weight percent |
|---|---|
| Hemihydrate | 50.4 |
| Soluble anhydrite | 37.1 |
| Gypsum | 2.0 |
| Insoluble anhydrite | 0.6 |
| Free moisture | Nil |

The sieve analysis of the end-product was as follows:

| British Standard Screen size: | Weight percent |
|---|---|
| +10 | 5.4 |
| −10 +16 | 21.1 |
| −16 +25 | 27.6 |
| −26 +36 | 19.0 |
| −36 +44 | 8.4 |
| −44 +100 | 15.2 |
| −100 | 3.2 |

The product was retarded with keratin and applied to the usual grounds. The water mix for application to brick walls was 74 parts by weight of water to 100 parts of plaster and the wet density on the trowel was 75 lbs./cu. ft. An excellent bond was obtained on bricks.

EXAMPLE 15

The procedure of Example 13 was followed, using the same starting plaster but omitting the lime and ammonium sulphate. Instead, 1% of potassium alum, $K_2SO_4.Al_2(SO_4)_3.24H_2O$, (referred to the weight of plaster) was added at the foaming machine stage. The quantities used were as follows:

50 lbs. hemihydrate plaster,
27 lbs. water,
227 grams potassium alum,
150 grams keratin, and
3 litres of foaming agent solution as in Example 1 (0.625% by weight of the liquid as received from the manufacturers).

Calcination was carried out in a tray dryer at 375° F. for 24 hours. The end product was crisp and, when gauged with water to plastering consistency, there was a noteworthy absence of stickiness and the mix spread and worked easily when plastered on a wall. The wet bulk density on the trowel was only 69 lbs./cu. ft., the gauge being 74 parts by weight of water to 100 parts of plaster. The dry strength on the wall was comparable with that usually found with lightweight plasters.

EXAMPLE 16

The process of Example 15 was repeated save that the recipe was changed to:

50 lbs. hemihydrate plaster,
23 lbs. water,
226 grams "Wafex" (Sulphite lye powder),
10 grams keratin, and
3 litres of foaming agent solution as in Example 1 (2 litres prefoamed).

A hard cellular cementitious end product was obtained.

What I claim is:

1. A cementitious material in the form of cellular granular particles, said particles consisting essentially of a major proportion of at least one material selected from the group consisting of soluble anhydrite and calcium sulphate hemihydrate.

2. A cementitious material in the form of cellular granular particles, said particles consisting essentially of a major proportion of at least one material selected from the group consisting of soluble anhydrite and calcium sulphate hemihydrate, said particles being substantially wholly of a particle size in the range −5 to +100 mesh British Standard Sieve size.

3. A cementitious material in the form of cellular granular particles, said particles consisting essentially of at least one material selected from the group consisting of soluble anhydrite and calcium sulphate hemihydrate, and containing in the granules a quantity of pulverized fuel ash, the latter constituting less than one third of the total weight of the cementitious material.

4. A process for the production of cementitious material wherein a cellular set mass consisting at least mainly of calcium sulphate dihydrate is subjected to the steps of drying and calcination to render it cementitious and to the step of comminution, said step of comminution being effected at any desired stage with respect to the steps of drying and calcination.

5. A process for the production of cementitious material wherein a cellular set mass consisting at least mainly of calcium sulphate dihydrate is subjected to the step of dehydration by heating in the presence of water under pressure in a closed vessel at a temperature in the range of 140–190° C. until it is converted essentially to a cementitious state followed by drying at a temperature of about 110° C. and to the step of comminution into granules, said step of comminution being effected at any desired stage with respect to the step of calcination.

6. A process for the production of cementitious material which comprises the steps of making a foam of at least one calcium sulphate plaster in water, allowing the foamed mass to set, drying and calcining the set foamed mass to render it cementitious, and comminuting the set foamed mass, the step of comminuation being effected at any desired stage with respect to the steps of drying and calcination.

7. A process for the production of cementitious material which consists essentially of the steps of making a foam comprising finely ground anhydrite in water, incorporating an accelerator of set in the foamed mass, allowing the foamed mass to set, drying and calcining the set foamed mass to render it cementitious, and comminuting the set foamed mass, the step of comminution being effected at any desired stage with respect to the steps of drying and calcination.

8. A process for the production of cementitious material which comprises the steps of making a foam of at least one calcium sulphate plaster in water, incorporating in the foam a minor proportion of an additive selected from the group consisting of hydrated lime, calcium oxide, and Portland cement, allowing the foam mass to set, drying and calcining the set foamed mass to render it cementitious, and comminuting the set foamed mass, the step of comminution being effected at any desired stage with respect to the steps of drying and calcination.

9. A process for the production of cementitious material which comprises the steps of making a foam in water of at least one calcium sulphate plaster and up to one half of the weight of the plaster of gypsum, allowing the foamed mass to set, drying and calcining the set foamed mass to render it cementitious and comminuting the set foam mass, the step of comminution being effected at any desired stage with respect to the steps of drying and calcination.

10. A process for the production of cementitious material which consists essentially of the steps of making a foam in water of at least one calcium sulphate plaster, comprising at least one of calcium sulphate hemihydrate and soluble anhydrite in a total proportion equivalent to at least 80% by weight of calcium sulphate hemihydrate, allowing the foamed mass to set, drying and calcining the set foamed mass to render it cementitious and comminuting the set foamed mass, the step of comminution being effected at any desired stage with respect to the steps of drying and calcination.

References Cited in the file of this patent

UNITED STATES PATENTS

| | | |
|---|---|---|
| Re. 18,739 | Roos | Feb. 14, 1933 |
| 2,322,194 | King | June 15, 1943 |